United States Patent [19]

Alia

[11] 4,197,381
[45] Apr. 8, 1980

[54] PREPARATION OF VULCANIZABLE COMPOSITIONS BY EXTRUDER MIXING

[76] Inventor: Dominic A. Alia, 1609 Sheridan St., Williamsport, Pa. 17701

[21] Appl. No.: 735,225

[22] Filed: Oct. 22, 1976

[51] Int. Cl.$^2$ .................. C08L 9/00; C08L 23/16; C08L 27/04; C08L 33/06
[52] U.S. Cl. .................. 525/222; 264/174; 264/236; 264/349; 525/214; 525/232; 525/240
[58] Field of Search ............... 260/889, 897 B, 897 C, 260/897 R, 897 L, 899, 901; 264/236, 349, 174

[56] References Cited

U.S. PATENT DOCUMENTS

| | | | |
|---|---|---|---|
| 3,226,356 | 12/1965 | Kehr et al. | 526/22 |
| 3,227,698 | 1/1966 | Robinson | 526/19 |
| 3,228,762 | 1/1966 | Luckenbaugh | 71/83 |
| 3,288,762 | 11/1966 | Maynard | 526/52 |
| 3,296,184 | 1/1967 | Portolani et al. | 526/19 |
| 3,300,541 | 1/1967 | Latty | 526/20 |
| 3,301,837 | 1/1967 | Bartorelli et al. | 526/19 |
| 3,340,245 | 9/1967 | Oser et al. | 526/12 |
| 3,372,139 | 3/1968 | Behr et al. | 526/19 |
| 3,399,181 | 8/1968 | Bornemann et al. | 526/17 |
| 3,608,031 | 9/1971 | Stastny et al. | 264/236 |
| 3,864,069 | 2/1975 | Takiura et al. | 264/349 |
| 3,923,947 | 12/1975 | Cook | 264/349 |
| 3,936,523 | 2/1976 | Kleeberg et al. | 264/174 |
| 3,954,907 | 5/1976 | Schober | 526/13 |
| 4,020,214 | 4/1977 | MacKenzie | 264/174 |
| 4,046,849 | 9/1977 | Lever et al. | 264/349 |
| 4,057,607 | 11/1977 | Soehngen et al. | 264/349 |

FOREIGN PATENT DOCUMENTS 952336  3/1964  United Kingdom ............... 260/889

OTHER PUBLICATIONS

"Condensed Chemical Dictionary, Sixth Edition, Reinhold Publishing Co., 1961, p. 979.
"Hackh's Chemical Dictionary," Fourth Edition, McGraw-Hill, Inc., 1969, pp. 578 and 579.

Primary Examiner—Allan Lieberman
Attorney, Agent, or Firm—Sughrue, Rothwell, Mion, Zinn and Macpeak

[57] ABSTRACT

Cross-linkable polymers are prepared by the introduction of the cross-linking agent to the main body of the polymer to be cross-linked in an extruder. This method reduces the "heat history" of the cross-linkable polymer and allows greater pre-extruder processing flexibility. Thus, mixing times can be reduced and the shelf life of the pre-extruded polymeric composition can be extended. After extrusion, the product may be cross-linked by heating.

34 Claims, 1 Drawing Figure

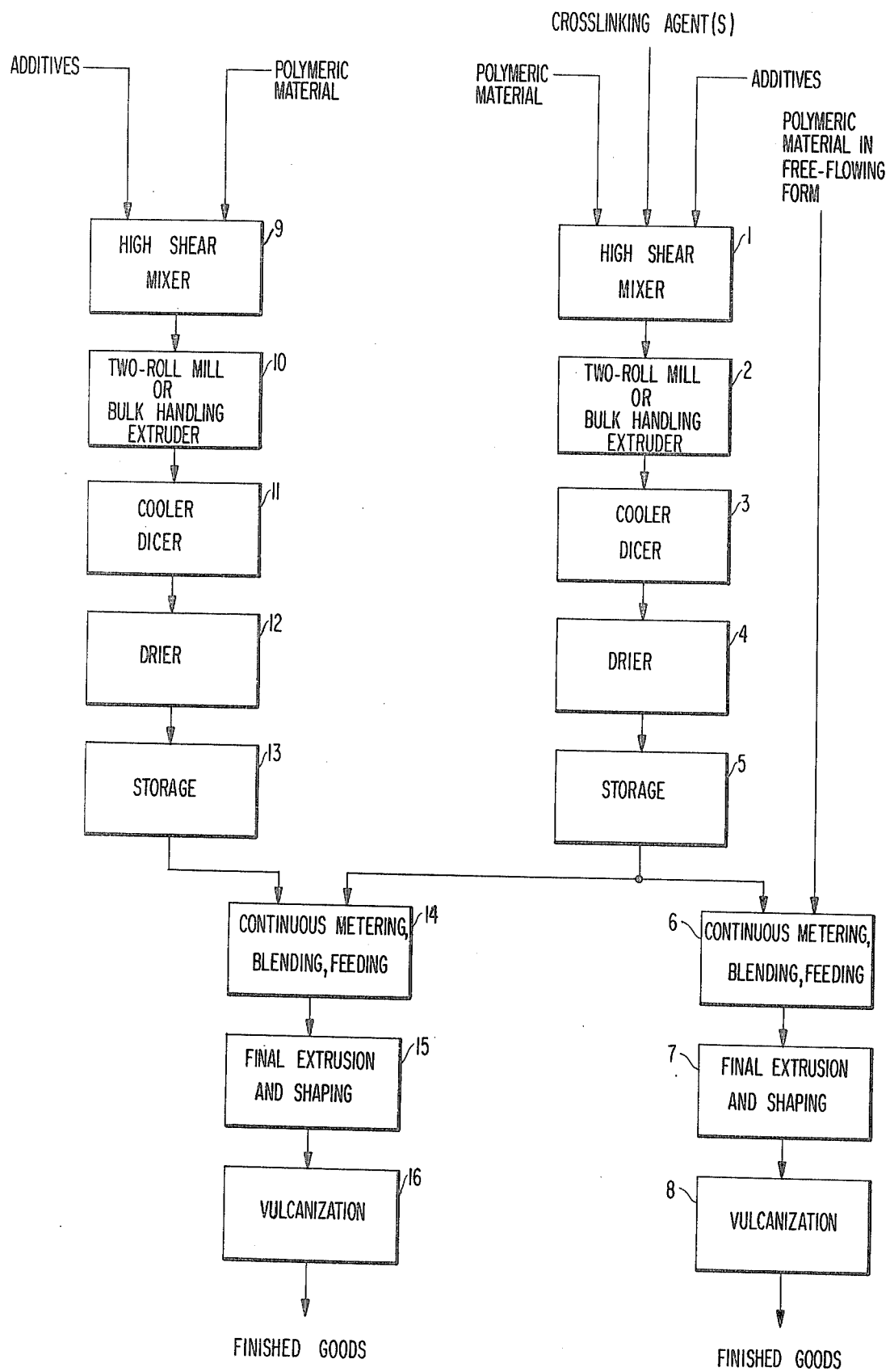

PREPARATION OF VULCANIZABLE COMPOSITIONS BY EXTRUDER MIXING

BACKGROUND OF THE INVENTION

In the handling and fabrication of polymers to be cross-linked, substantial problems may be encountered in view of the "scorchy" nature of the compositions. The tendency of such compositions to prematurely cross-link or vulcanize together with a short shelf life will result in the necessity for an exacting schedule for the fabrication operation. Even with such a rigorously maintained schedule for the fabrication of materials, loss of material through premature vulcanization is often encountered.

A conventional technique for the compounding of polymers to be subsequently cross-linked is a two-pass mixing cycle utilizing a mixer such as a Banbury mixer. In the first cycle of this process, the bulk of the ingredients to be present in the final cross-linked product, i.e. polymer, fillers, processing aids, antioxidants, etc., with the exception of the cross-linking agent itself are incorporated into a homogeneous base compound in a high-shear mixer such as a Banbury mixer. The heat generated during this first cycle is so great that the addition of the cross-linking agent would initiate the cross-linking and would result in a "scorched" composition. That is, the mechanical energy transferred to the material being mixed increases the heat content of the mass, resulting in composition temperatures as high as 170° C. and the addition of cross-linking agents to these base compositions while in their high energy state would result in their immediate vulcanization. Thus, in the second stage of this technique, the cross-linking agent is added to the product of the first cycle at a lower temperature, e.g. about 90° C., in a two-roll mill or in a mixer such as a Banbury mixer. This accelerated composition, i.e., having the cross-linking agent in admixture therewith, is then cooled, dried and possibly stored to await final fabrication such as by extrusion and heating to effect cross-linking.

However, this two-pass mixing cycle technique has significant disadvantages. Storage, even at room temperature, may result in some degree of cross-linking or thermosetting of the polymer. The time requirements which are imposed upon this process in view of the premature cross-linking are significant and may require strict compounding schedules which would require an undesirable inflexibility in the use of available equipment. Even with such a schedule, prematurely cross-linked batches which cannot be used for the desired final product may be generated.

Although a method has been proposed in U.S. Pat. No. 3,923,947 for the introduction of a cross-linking agent into polyethylene in order to overcome some of these disadvantages, a need exists for a reliable process to cure these problems in general.

At present, many vulcanizable compositions based on neoprene (polychloroprene), hypalon (chlorosulfonated polyethylene), nitrile rubber (acrylonitrile butadiene copolymer), SBR (styrene butadiene copolymer), and butyl rubber, exhibit such short shelf-life that inter-plant shipments of these compositions from the point of preparation to the point of final conversion is limited to short distances. This leads either to duplication of manufacturing effort and equipment requirements or to the specialization of manufacturing plants which at times causes restrictive inflexibility of overall manufacturing capabilities.

Therefore, an object of the present invention is a process for the preparation of cross-linkable polymeric compositions with low levels of "heat history", i.e., polymeric compositions with the cross-linking agent in admixture therewith yet low levels of cross-linking.

A further object of the present invention is a process for the preparation of polymeric compositions which have long shelf lives yet need only be extruded before the cross-linking operation itself.

A further object of the present invention is a process for the preparation of cross-linkable polymeric compositions by which the generation of unusable scrap is reduced.

An additional object of the present invention is the preparation of polymeric compositions containing a cross-linking agent whereby inter-plant transportation of such compositions would be possible as the result of an increased storage shelf life. This factor would allow the decentralization of various equipment or the utilization of existing facilities without the requirement that machinery such as mixers and extruders be present in one location.

A still further object of the present invention is a process for the preparation of compositions which are more tolerant to variances that occur within final fabrication equipment such as extruders.

SUMMARY OF THE INVENTION

The above objects are achieved by a process for the production of a cross-linkable mixture of a polymer and a cross-linking agent whereby a first composition comprising a polymer and a second composition comprising the cross-linking agent are fed into an extruding means and are extruded to produce an admixture of the two compositions. This admixture may then be cross-linked, or thermoset, by conventional techniques.

A first preferred embodiment of the invention comprises feeding a first composition which consists essentially of a virgin polymer with a second composition comprising an admixture of a polymer with a cross-linking agent into the extruder.

A second preferred embodiment of the present invention comprises feeding a first composition containing a polymer and additives and a second composition comprising a cross-linking agent and a resin in admixture into an extruder and extruding the first and second compositions in admixture.

The above compositions used in the two embodiments may be processed at temperatures from 80° to 160° C. and thereafter stored for extended periods of time at ambient temperatures from 25° to 50° C. without scorching.

BRIEF DESCRIPTION OF THE DRAWINGS

The drawing indicates a schematic flow diagram of two embodiments of the present invention.

DETAILED DESCRIPTION OF THE INVENTION

An important aspect of the present invention is the introduction in an extruder and just before the cross-linking operation of a cross-linking agent into the bulk of the polymer which will be subsequently cross-linked. In a first embodiment of the present invention, the extruder performs the function of acceleration, i.e., the introduction of a cross-linking agent, and the function of dilution whereby virgin resin is fed into the extruder as designated by extruder operation 7 of the figure. In a second embodiment of the present invention, the extruder performs the acceleration function by extruding a base concentrate containing the polymer and various additives and a concentrate of materials containing the cross-linking agent as designated in the figure at extruder operation 15.

A wide variety of cross-linkable polymers can be utilized according to the process of the present invention. Such polymers are exemplified by a polyethylene homopolymer or copolymer (hereinafter referred to as a "polyethylene polymer") or a mixture of a polyethylene polymer with ethylene vinyl acetate copolymers, chlorinated polyethylenes, chlorosulfonated polyethylenes such as Hypalon, ethylene propylene copolymers, ethylene propylene diene terpolymers, polychloroprenes such as Neoprene, acrylonitrile butadiene copolymers, acrylonitrile butadiene copolymer-polyvinyl chloride polymer blends, styrene butadiene copolymers, butyl rubbers, polyisobutylene, polyepichlorohydrin, natural rubber, natural rubber derivatives, polyvinyl chloride polybutadiene rubbers, polyisoprenes, silicone rubbers, acrylic rubbers, polysulfide rubber polyurethanes or a mixture of a polyester and a chlorinated polyethylene.

In general, the above-mentioned polymers may either be considered resins or elastomers. Resin-type polymers have a crystalline structure and are hard at room temperatures whereas elastomer-type polymers are amorphous at all temperatures, tacky and tend to coalesce on standing. Thus, elastomers are considered to have "nerve" which make them difficult to process without the use of plasticizers and fillers such as oils, carbon black and clay. However, within the generic classification of a polymer, e.g., an ethylene propylene copolymer, some of the specific polymers may be considered resins while others would be better classified as elastomers.

In general, polymers which can be considered resins can be used as the cross-linkable polymer in either the first or second embodiments of the present invention while polymers that can be considered elastomers are most preferably used as the cross-linkable polymer in the second embodiment of the present invention.

Among the polyethylene homopolymers which can be used is the LD-400 polyethylene supplied by Exxon. Most, if not all, polyethylene homopolymers can be considered resins as indicated above.

The ethylene copolymers resins contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage. These other interpolymerizable compounds may be hydrocarbon compounds such as butene-1, pentene-1, isoprene, butadiene, bicycloheptene, bicycloheptadiene, and styrene as well as vinyl compounds such as vinyl acetate and ethyl acrylate. For example, an ethylene copolymer may contain greater than 0 and up to 30 weight percent of propylene, and greater than 0 and up to 20 weight percent of butene-1, and greater than 50 and up to 100 weight percent of ethylene.

Examples of the ethylene vinylacetate copolymers which can be used as resins in the present invention include the LD-401 ethylene vinylacetate copolymer supplied by Exxon and the EVA-3737 ethylene vinylacetate copolymer supplied by Union Carbide. Preferably, the ethylene vinylacetate copolymers will contain from about 2 to 35% vinylacetate. The copolymers will preferably have a melt index from about 2 to 100. However, a wide variety of ethylene vinylacetate copolymers, generally considered to be resins as defined above, can be used according to the present invention as supplied by a wide variety of manufacturers.

Ethylene-propylene copolymers which can be used according to the present invention include Vistalon materials such as Vistalon 702 and 707, supplied by Exxon. Ethylene-propylene copolymers with levels of ethylene of 50% and above are generally available as free-flowing pellets, can be considered resins as defined above and can be utilized in either the first or second embodiments of the present invention. Ethylene-propylene copolymers having ethylene contents below about 30% are generally not available in free-flowing pellet form and would be considered elastomers and can therefore be used in the second embodiment of the present invention.

The ethylene polymers may be used individually or in combination thereof. The ethylene polymers have a density of about 0.89 to 0.96 (ASTM D-7920-60 T) and a melt index of about 0.1 to 160 (ASTM D-1238-62 T).

Ethylene-propylene diene terpolymers which are elastomers and which can be used in the present invention are exemplified by the Nordell materials such as Nordell 2722 supplied by DuPont. However, a wide variety of such terpolymers can be used. Ethylene-propylene diene terpolymers containing amounts of ethylene from 50% and above possess properties whereby they would be considered resins as defined above. Thus, such terpolymers having 50% or above ethylene can be used in either the first or second embodiments of the present invention while ethylene-propylene diene terpolymers having below 50% ethylene are most preferably utilized in the second embodiment of the present invention. A wide variety of these terpolymers can be used in the present invention as obtained from a wide variety of commercial sources.

Chlorinated polyethylenes which can be used in the present invention are those such as the CPE SD-566 chlorinated polyethylene supplied by Dow Chemical. Chlorinated polyethylenes are generally considered to be elastomers as defined above.

Chlorosulfonated polyethylenes which can be used in the present invention include the Hypalon materials such as Hypalon 40-E supplied by DuPont. Chlorosulfonated polyethylenes are generally considered to be elastomers as defined above and can preferably be used as the cross-linkable polymer in the second embodiment of the present invention.

Polychloroprenes which can be used in the present invention include the Neoprene materials such as Neoprene W supplied by DuPont. It should be noted that an important aspect of the present invention is a reduction in the levels of fillers such as carbon black and clay required to produce processible elastomers such as Neoprene. This is believed to be caused by the use of a resin in the second embodiment of the present invention which may serve as a high temperature primary plasticizer thereby reducing the "nerve" of the base elastomer. These especially surprising results are described in the Examples.

An example of the acrylonitrile butadiene copolymer that can be used in the present invention is the Paracril BJLT materials supplied by UniRoyal. These materials are generally considered to be elastomers as defined above. Additionally, acrylonitrile butadiene copolymer-polyvinyl chloride blends such as Paracril OZO supplied by UniRoyal can be used as elastomers in the present invention.

Styrene-butadiene copolymers such as SBR-1503 styrene-butadiene copolymer obtained from Phillips Petroleum can be used as an elastomer in the present invention.

Although the above polymers are exemplified as being usable in the present invention, it should be noted that a great variety of cross-linkable polymers can be used in the present invention and virtually all of the above-mentioned polymers which are cross-linkable can be utilized.

Additives used as a part of the vulcanizable compositions that can be prepared by the present invention include materials such as fillers, e.g. carbon black, clays, talc, and calcium carbonate, antioxidants, activators, colorants, UV stabilizers and processing aides.

Fillers utilized in the production of cross-linked polymers can be used in the present invention. Thus, clays, carbon black, silicates, silicas, talc, calcium carbonate and other fillers can be used as known in the art. Fillers can comprise 0 to 250 parts to 100 parts by weight of the polymer in the final product.

The vulcanizable compositions comprising polymeric material and peroxide vulcanizing agents are preferably protected against oxidation by amine-type antioxidants and sterically hindered phenols such as polymerized 1,2-dihydro-2,2,4-trimethylquinoline; 1,3,5,-trimethyl-2,4,6-tris-(3,5,di-tertiary butyl-4 hydroxy benzyl) benzene; and di-(2 methyl-4-hydroxy-5-t-butyl phenyl) sulfide. These antioxidants can be used in weight ratio 0.2 to 2 parts to 100 parts by weight of polymeric material.

The vulcanizable compositions comprising polymeric material and all the other cross-linking agents can be protected against oxidation with both amine-type and all phenolic-type antioxidants. These antioxidants can be used in weight ratio 0.2 to 5 parts to 100 parts by weight of polymeric material. Antioxidants such as the Age Rite antioxidants supplied by R. T. Vanderbuilt can be used in the present invention as known in the art.

Activators, stabilizers, flame retardant agents colorants, lubricants, UV stabilizers, tackifiers, blowing agents, coupling agents, reodorants and fungicides as well as other additives can also be used in the process of the present invention as known in the art. The total amount of additives will range in weight ratio more than 0 up to 300 parts to 100 parts of polymeric material.

Cross-linking agents which can be used include those known in the prior art. The term corss-linking agent which is used to describe the vulcanizable compositions to be prepared by the present invention are those compounds which act as primary vulcanizing agents; these include peroxides such as dicumyl peroxide; α,α′-bis(t-butyl peroxy) di-isopropylbenzene; di-t-butyl peroxide; 2,5 di-methyl-2,5-bis-(t-butyl peroxy) hexyne-3; and 2,5-dimethyl-2,5-bis-(t-butyl peroxy) hexane; tellurium; sulfur; selenium; nitrobenzene; m-di-nitrobenzene; 1,3,5-tri-nitrobenzene; quinone derivatives such as chlorinated quinone (chloranil); p-quinone dioxime; dibenzoyl quinone dioxime; N,N′-m-phenylene-dimaleimide when added to hypalon; and magnesium oxide and zinc oxide when added to neoprene.

Also included in the term cross-linking agent are those compounds which substantially increase the rate of chemical cross-linking leading to vulcanization. These include inorganic accelerators such as white lead, lead oxides, hydrated lime, magnesium oxide, calcium oxide, cadmium oxide, and zinc oxide; and organic accelerators belonging to the classes, aldehydeamines; guanidines; thiazoles; thiurams; di-thiocarbamates; sulfenamides; and thioureas.

Although formulations comprising only peroxide-type vulcanizing agents can be designed with all polymeric materials, formulations comprising other vulcanizing agents and/or accelerators (either inorganic or organic) are preferably formed with polymeric materials without residual sites of unsaturation or other chemically active sites. Some ethylene polymers and choloronated polyethylene or combinations thereof form inert vehicles for vulcanizing and accelerating agents. The selection of the particular cross-linking agent may depend upon the particular polymer to be cross-linked and will generally be easily determined as known in the art.

Since different vulcanizing or cross-linking agents are used in varying proportions depending on the polymer utilized, the following formulations are given as preferred ranges.

Vulcanizable compositions comprising in weight ratio 0.1 to 5 parts peroxide-type vulcanizing agents and 100 parts by weight polymeric material can comprise any of the following polymers: natural rubber, derivatives of natural rubber, styrene-butadiene copolymer, polybutadiene rubber, polyisoprene, acrylonitrile-butadiene copolymer, polychloroprene, ethylene propylene copolymer, ethylene-propylene diene terpolymer, ethylene-vinylacetate copolymer, ethylene-ethyl-acrylate copolymer, ethylene-butene-1 copolymer, ethylene-pentene-1 copolymer, ethylene-isoprene copolymer, ethylene-butadiene copolymer, ethylene-styrene copolymer, silicone rubber, acrylic rubber, polysulfide rubber, polyurethane, acrylonitrile-butadiene-styrene terpolymer, polyethylene, polyester, chlorosulfonated polyethylene, and chlorinated polyethylene. These vulcanizates can form at temperatures of 140° to 250° C.

Vulcanizable compositions comprising in weight ratio 3 to 10 parts m-dinitro benzene to 100 parts by weight polymeric material can comprise any of the following polymers: natural rubber, styrene-butadiene copolymer and acrylonitrile-butadiene copolymer. These vulcanizates can form at temperatures of 130° to 200° C.

Vulcanizable compositions comprising in weight ratio 1.5 to 5 parts 1,3,5,-trinitrobenzene and 100 parts by weight polymeric material can comprise any of the following polymers: natural rubber, styrene-butadiene copolymer and acrylonitrile-butadiene copolymer. These vulcanizates can form at temperatures of 120° to 200° C.

Vulcanizable compositions comprising in weight ratio 2 to 10 parts chlorinated quinone (chloranil) to 100 parts by weight polymeric material can comprise any of the following polymers: natural rubber, styrene-butadiene, copolymer and acrylonitrile-butadiene copolymer. These vulcanizates can form at temperatures of 100° to 200° C.

Vulcanizable compositions comprising in weight ratio 0.5 to 10 parts tellurium and 100 parts by weight polymeric material can comprise any of the following polymers: natural rubber, styrene-butadiene copolymer acrylonitrile-butadiene copolymer and ethylene-propylene diene terpolymer. These vulcanizates can form at temperatures of 120° to 200° C.

Vulcanizable compositions comprising in weight ratio 0.5 to 10 parts selenium and 100 parts by weight polymeric material can comprise any of the following polymers: natural rubber, styrene-butadiene copolymer acrylonitrile-butadiene copolymer and ethylene-propylene diene terpolymer. These vulcanizates can form at temperatures of 120° to 200° C.

Vulcanizable compositions comprising in weight ratio 2 to 10 parts zinc oxide or magnesium oxide and 100 parts by weight of neoprene (polychloroprene) can form vulcanizates at temperatures of 100° to 200° C.

Vulcanizable compositions comprising in weight ratio 5 to 10 parts by weight sulfur to 100 parts by weight polymeric material can comprise any of the following polymers: natural rubber, styrene-butadiene copolymer, acrylonitrile-butadiene copolymer, ethylene-propylene diene terpolymer, neoprene, butyl rubber, polybutadiene, polyisobutylene, polyisoprene and hypalon. These vulcanizates can form at tmperatures of 100° to 200° C. However, the rate of vulcanization is slow and accelerators of vulcanization are used to speed the chemical reaction, such as stearic acid, lauric acid and zinc oxides. These activators are usually used in weight ratio 0.5 to 5 parts to 100 parts of polymeric material.

Vulcanizable compositions comprising in weight ratio 0.5 to 5 parts aldehyde-amine or quanidine type accelerating agents to 1.0 to 5.0 parts by weight sulfur to 100 parts by weight polymeric materials can comprise any of the following polymers: natural rubber, styrene-butadiene copolymer, acrylonitrile-butadiene copolymer, ethylene propylene diene terpolymer, neoprene, butyl rubber, polybutadiene, polyisobutylene and polyisoprene. These vulcanizates can form at temperatures of 100° to 200° C.

Vulcanizable compositions comprising in weight ratio 0.5 to 5.0 parts thiazole type accelerating agents to 0.5 to 5 parts sulfur to 100 parts by weight polymeric material can comprise any of the following polymers: natural rubber, styrene-butadiene copolymer, acrylonitrile-butadiene copolymer, ethylene propylene diene terpolymer, neoprene, butyl rubber, polybutadiene, polyisobutylene, polyisoprene and hypalon. These vulcanizates can form at temperatures of 100° to 200° C.

Vulcanizable compositions comprising in weight ratio 0.5 to 5.0 parts Thiazoline type accelerating agents to 0.5 to 5.0 parts by weight sulfur to 100 parts by weight polymeric material can comprise any of the following polymers: natural rubber, styrene-butadiene copolymer, acrylonitrile-butadiene copolymer, ethylene propylene diene terpolymer, neoprene, butyl rubber, polybutadiene, polyisobutylene and polyisoprene. These vulcanizates can form at temperatures of 100° to 200° C.

Vulcanizable compositions comprising in weight ratio 0.5 to 5.0 parts thiuram type accelerating agents to 0.5 to 5.0 parts by weight sulfur to 100 parts by weight polymeric material can comprise any of the following polymers: natural rubber, styrene-butadiene copolymer, acrylonitrile-butadiene copolymer, ethylene-propylene diene terpolymer, neoprene, butyl rubber, polybutadiene, polyisobutylene, polyisoprene and hypalon. These vulcanizates can form at temperatures of 100° to 200° C.

Vulcanizable compositions comprising in weight ratio 0.5 to 5.0 parts dithiocarbamate type accelerating agent to 0.5 to 5.0 parts by weight sulfur to 100 parts by weight polymeric material can comprise any of the following polymers: natural rubber, styrene-butadiene copolymer, acrylonitrile-butadiene copolymer, ethylene-propylene diene terpolymer, neoprene, butyl rubber, polybutadiene, polyisobutylene, polyisoprene and hypalon. These vulcanizates can form at temperatures of 100° to 200° C.

Vulcanizable compositions comprising in weight ratio 0.5 to 5.0 parts sulfenamide type accelerating agent to 0.5 to 5.0 parts by weight sulfur to 100 parts by weight polymeric material can comprise any of the following polymers: natural rubber, styrene-butadiene copolymer, acrylonitrile-butadiene copolymer, ethylene-propylene diene terpolymer, neoprene, butyl rubber, polybutadiene, polyisobutylene, polyisoprene and hypalon. These vulcanizates can form at temperatures of 100° to 200° C.

Vulcanizable compositions comprising in weight ratio 0.5 to 5.0 parts thiourea type accelerating agent to 100 parts by weight polymeric material comprising neoprene can form vulcanizates at temperatures of 100° to 200° C.

The figure shows a schematic flow diagram of the first (operations 1–8) and second (operations 9–16 and 1–5) embodiments of the present invention. Although the preparation of mixtures comprising cross-linking agents and the preparation of mixtures comprising polymeric material and additivies is depicted as being performed by two separate equipment arrays, a single array as shown by operations 1 through 4 or 9 through 12 can be used, provided thorough clean-out procedures are followed when changing over from one composition to another. This is common practice in the present state of the art. Similarly, the continuous metering, blending, and feeding device and the final extruder operations 6 and 7, and 14 and 15, can actually be the same pieces of equipment provided they are thoroughly cleaned with each composition change. Again, this is common practice. Mixing operations 1 and 9 are performed by a conventional, high-shear type mixer, such as a Banbury. In preparing the mixtures comprising the cross-linking agents, care should be taken to avoid excessive heat generation and, in general, temperatures above 120° C. should be avoided. The selection of polymeric materials as set forth herein will insure against excessive heat generation.

Milling operations 2 and 10 can be performed either by a two-roll mill or a bulk-handling extruder, both of which should be operated between 90° and 120° C. The operation converts the masticated mass issuing from the high-shear mixer into a shape which facilitates the next operation of cooling and dicing or pelletizing indicated as operations 3 and 11. This is commonly performed by such equipment as a "stair dicer" or a "pelletizing head". The material entering the dicers has usually been cooled in water troughs and the pelletizing heads are usually flooded with a cooling water spray. The water is removed from the particles in drying operations 4 and 12 with a conventional continuous through-circulation dryer operated at about 40° C. before storage in operations 5 and 13. The continuous metering, blending, and extruder feeding in operations 6 and 14 is performed with a device such as the Conair Corporations's "Autocolor". The material fed into the device must be in free-flowing, particulate form approximately 1/16 to ⅜ of an inch in dimension. The final extruders and the shaping tools comprising extruding operations 7 and 15 can be conventional pumping type devices equipped with conventional metering screws or the various mixing screw designs such as those available from the Davis Standard Corporation. Within the embodiment of the present invention, the extruders should operate in a temperature range of about 80° to 140° C. The vulcanization of the vulcanizable compositions in cross-linking operation 8 and 16 can be carried out in steam with temperatures to 300° C. or with dry heat, or by radiation.

In a first embodiment of the present invention, an accelerated base concentrate is prepared in mixing operation 1 as shown in the figure and is taken through to a possible storage step 5. After the addition of the virgin polymer at extruder 7 it is subsequently cross-linked to yield the desired cross-linked product.

In the mixing step 1 of the first embodiment of the present invention, a resin polymer is blended with a cross-linking agent, additives such as antioxidants, process aids, fillers, plasticizers and stabilizers to yield an accelerated base concentrate. The polymer to be used in mixing operation 1 should be one or more resins with or without an elastomer.

In formulating the base concentrate for use in the first embodiment as well as the base compound and cross-linking concentrate in the second embodiment, the nature and amount of the polymers used are chosen according to the following criteria.

Physically, the three entities must be such that they can be put into a particulate form which is and remains free-flowing in storage operations 5 and 13. Thus, the three entities must have particle fluidity, mutual miscibility, and homogenity. Although they can be used in particle sizes less than about 1 inch, they are preferably used in sizes from about 1/16 to ⅜ of an inch.

The ethylene polymers and a few other polymers used as the resins in the present invention to render the three entities storable in particulate form should have the crystalline properties indicated whereby they are considered resins, i.e., they exhibit a phase change within normal handling and processing temperature ranges from 25° to 140° C. Thus, the resins reversibly go from a crystalline phase to an amorphous phase within this temperature range. The formulation of free-flowing particles from these polymers is the result of their crystalline nature at ambient temperatures. Within the embodiment of this invention, these polymers are used to increase the ambient-temperature crystallinity of elastomers which are of an amorphous nature at these temperatures.

Some ethylene polymers, natural rubber, butyl rubber, neoprene, hypalon, chlorinated polyethylene, styrene-butadiene copolymer, acrylonitrile-butadiene copolymer, polybutadiene, polyisoprene, remain in the amorphous state within normal handling and processing temperatures of 25° to 140° C. These polymers are characterized by a viscosity-temperature profile which is rather flat, that is, the viscosity of these polymers is only slightly or moderately changed with changes in temperature. This characteristic aids the uniform dispersion of cross-linking agents and additives in these polymers. Within the embodiment of this invention, these amorphous polymers are used to promote the dispersion of cross-linking agents and additives in crystalline polymers. These elastomeric amorphous polymers are therefore used as dispersing aids.

Two of the three requirements necessary for the three entities, i.e., particle fluidity and homogenity, can be achieved through the blending of crystalline resin type and amorphous elastomeric type polymers. The mutual miscibility requirement is achieved by selecting vehicle polymers for the cross-linking agents to be intimately mixed with the polymer to be cross-linked in the extruder so that both polymers have similar degrees of polarity and similar molecular structure.

Further, the choice and amounts of the polymers used in the three entities will depend on the plastic properties of the entities at processing temperatures since it is known that these plastic properties will be indicative of how they will process in extruders and result in finished goods with the desired appearance and dimensional tolerances. Generally, as is known in the art, compositions designed for extruder processing are characterized by Mooney viscosities at 121° C. in the range of 3 to 75 Mooney points after four minutes. This measurement is made in a Mooney viscosity apparatus equipped with a large rotor that rotates at a speed of two revolutions per minute.

Further, the viscosity of polymers or blends of polymers to be extruded should be such that when the polymer or polymers are tested in a Brabender mixing bowl apparatus conditioned to 100° C. and operated with the mixing blades rotating at 40 rpm, the recorded energy required to perform the mixing should be in the range of 700 to 3500 meter-grams.

As indicated above, the base concentrate used in the first embodiment and the base compound and cross-linking concentrate used in the second embodiment of the invention are all formed from at least one resin and at least one elastomer mixed in proportions depending on the Mooney viscosity and energy requirements of the blend.

An energy requirement determination is shown in the following reference example.

REFERENCE EXAMPLE

The energy requirements for polymer blends have been measured with a Barbender apparatus equipped with a 50 c.c. mixing bowl. The data presented below were accumulated for chlorinated polyethylene 566 and ethylene vinylacetate (EVA) LD 401 system which was stabilized with red lead ($Pb_3O_4$) 5 parts by weight to 100 parts by weight chlorinated polyethylene (CPE) and protected against oxidative degradation with 1 part by weight polymerized 1,2-dihydro-2,2,4-trimethylquinoline to 100 parts by weight of total polymer. The apparatus was set at rotor speeds of 40 rpm and a preheated bowl temperature of 100° C. Readings were taken after 5 minutes of mixing.

| Concentration of EVA LD-401 In CPE SD-566 By Weight % | 5-Minute Torque Reading In Meter-Grams | Temperature In ° C. After 5-Min. Of Mixing |
| --- | --- | --- |
| 0 | 4500 | 142 |
| 22 | 3050 | 140 |
| 44 | 2000 | 126 |
| 70 | 1700 | 120 |
| 100 | 1350 | 115 |

Experience has shown that polymeric material that requires energy inputs from 700 to approximately 3500 meter-grams (and preferably 1000 to 2000 m-g.) at 40 rpm and 100° C. mixing bowl temperatures are processable. The measured temperature rise indicates that a peroxide cure system, either dicumyl peroxide (DiCup) or an α,α'-bis(t-butyl-peroxy) diisopropylbenzane (Vulcup) can safely be used with EVA LD-401 concentrations from 20% by weight. DiCup can safely be used to processing temperatures of 140° C.

Each of the binary compositions, not having 100% of either EVA or CPE, was extruded through an ⅛ inch diameter die into rods which were cooled and diced. The three mixtures formed free-flowing particles. In all cases, there was no indication of particles coalescing at room temperature after several weeks of static storage.

In view of the above considerations, the following are examples of base concentrates for use in the first embodiment of the invention.

SAMPLE BASE CONCENTRATE FORMULATIONS

Sample No. 1 (Specific Gravity 1.24)

| Ingredients | Amounts |
|---|---|
| CPE SD-566 (a chlorinated polyethylene from Dow Chemical | 192.0 |
| EVA LD-401 (an ethylene-vinyl-acetate copolymer from Exxon) | 383.0 |
| Carbon Black N-550 (from Phillips Petroleum) | 557.0 |
| Age Rite MA (an antioxidant from R. T. Vanderbilt) | 35.0 |
| TriBase E (a basic lead silicate sulfate from NL Industries) | 5.0 |
| DiCup R (a cross-linking agent from Hercules) | 226.0 |
| | 1,398.0 grams |

Sample No. 2 (Specific Gravity 1.53)

| Ingredients | Amounts |
|---|---|
| Nordell 2722 (an ethylene-propylene diene terpolymer from DuPont) | 398.0 |
| Zinc Oxide MB | 72.2 |
| Agerite Resin D (an antioxidant from R. T. Vanderbilt) | 23.0 |
| Translink 37 (a treated calcined clay from Freeport Kaolin Co.) | 848.0 |
| Red Lead ERD-90 from Wyrough and Loser) | 72.2 |
| Polyethylene LD-400 (from Exxon) | 145.0 |
| DiCup R | 42.6 |
| | 1,601.0 grams |

Sample No. 3 (Specific Gravity 1.53)

| Ingredients | Amounts |
|---|---|
| Vistalon 707 (an ethylene-propylene copolymer from Exxon) | 392.0 |
| Zinc Oxide MB | 68.6 |
| Agerite Resin D | 22.8 |
| TAC Dry Mix (75%) from Kenrich Petrochemical) | 22.8 |
| KE Clay (a treated calcined clay from Burgess Pigment Co.) | 840.0 |
| Red Lead ERD-90 | 68.6 |
| EVA LD-401 | 143.6 |
| VulCup R (a cross-linking agent from Hercules, Inc.) | 42.5 |
| | 1,600.9 grams |

The accelerated concentrate can then be stored for extended periods of time and this represents an important aspect of the present invention since inter-plant shipment of accelerated concentrate from a central location to plants for final shaping is possible. Thus, maximum use can be made of one mixing location resulting in the elimination of the duplication of expensive mixing facilities at several locations. Such inter-plant shipments were previously not considered possible since many polymers which would be accelerated but not yet cross-linked would scorch or cross-link spontaneously at room temperature on prolonged standing before the final shaping and cross-linking would take place. Thus, the cross-linking agent is admixed with the bulk of the virgin polymer at a final extrusion step in accordance with the first embodiment of the invention.

The extrusion step 7 of the first embodiment of the present invention is accomplished by metering and blending the concentrate and the virgin polymer, both chopped into the desired size, into an extruder and extruding the mixture. Devices such as the Conair Autocolor or another metering, preblending and feeding device can be used in order to introduce the desired amounts of each component into the extruder. Preferably, the actual fed of the virgin polymer is regulated to yield an cross-linkable product with the cross-linking agent admixed therewith in the amount desired as known in the prior art.

In a second embodiment of the present invention, extruder acceleration is also achieved by the feeding of a base formulation from storage 13 of the figure with a cross-linking formulation from storage operation 5 into an extruder operation 15 whereby the bulk of the polymer is admixed with the accelerator in the extruder itself. This method also results in significant advantages such as a flexible compounding schedule and a minimization of scrap generation caused by premature cross-linking.

The base formulation is mixed in operation 9 of the figure and contains the elastomeric polymer to be subsequently cross-linked, a resin and additives. The presence of the resin in the base formulation is believed to enable the normally tacky elastomers to be manufactured into free-flowing and stable particles. A desirable result of this factor is that the elastomers may be stored, such as in step 13 of the figure, for long periods of time in order to enable flexible compounding schedules. Thus, resins such as the polyethylene, ethylenevinylacetate copolymers, ethylene-propylene diene terpolymers and ethylene-propylene copolymers are mixed with the elastomer in ratios to yield properties within the Mooney viscosity and energy requirement ranges indicated above.

Examples of the base formulation used in the second embodiment of the present invention as obtained from mixing step 9 in the figure are as follows:

SAMPLE BASE FORMULATIONS

Sample No. 4 (Specific Gravity 1.46)

| Ingredients | Amount (In Grams) |
|---|---|
| Neoprene W (a polychloroprene obtained from DuPont) | 714.0 |
| DQDA 3737 (an ethylene-vinyl-acetate copolymer obtained from Union Carbide) | 221.5 |
| Carbon Black N-550 | 238.0 |
| Hard Clay (a hydrated aluminum silicate obtained from J. M. Huber) | 270.7 |
| Agerite Stalite S (an antioxidant obtained from R. T. Vanderbilt) | 12.3 |
| Stearic Acid (obtained from Harwick Chemical) | 8.2 |
| Zinc Oxide MB | 16.4 |
| Red Lead MB | 119.0 |
| | 1,600.1 |

SAMPLE BASE FORMULATIONS (continued)

Sample No. 5 (Specific Gravity 1.44)

| Ingredients | Amount (In Grams) |
|---|---|
| Hypalon 40-E (a chlorosulfonated polyethylene obtained from DuPont) | 658.0 |
| DQDA 3737 | 226.0 |
| Carbon Black N-550 | 144.0 |
| Hard Clay | 413.4 |
| Stearic Acid | 8.2 |
| Litharge MB (90%) | 152.4 |
| | 1,602.0 |

Sample No. 6 (Specific Gravity 1.27)

| Ingredients | Amount (In Grams) |
|---|---|
| Paracril BJLT (an acrylonitrile-butadiene copolymer obtained from UniRoyal) | 584.0 |
| DQDA 3737 | 223.0 |
| Agerite MA | 12.8 |
| HiSil 233 (a hydrated silica obtained from PPG Industries) | 292.0 |
| Hard Clay | 219.0 |
| Stearic Acid | 7.3 |
| MgO | 43.8 |
| CdO | 20.0 |
| | 1,401.9 |

Sample No. 7 (Specific Gravity 1.32)

| Ingredients | Amount (In Grams) |
|---|---|
| Paracril OZO (an acrylonitrile-butadiene copolymer blended with polyvinyl chloride obtained from UniRoyal) | 595.0 |
| DQDA 3737 | 217.0 |
| Agerite Geltrol (an antioxidant obtained from R. T. Vanderbilt) | 10.9 |
| HiSil 233 | 292.0 |
| Hard Clay | 199.0 |
| Stearic Acid | 7.3 |
| Antimony Oxide (a flame retardant obtained from Chemitron) | 32.8 |
| MgO | 27.3 |
| ZnO | 21.9 |
| | 1,403.2 |

Sample No. 8 (Specific Gravity 1.365)

| Ingredients | Amount (In Grams) |
|---|---|
| SBR 1503 (a styrene-butadiene copolymer obtained from Phillips Petroleum) | 543.0 |
| DQDA 3737 | 220.0 |
| Agerite White (an antioxidant obtained from R. T. Vanderbilt) | 14.0 |
| Calcined Clay (a filler) | 615.0 |
| Stearic Acid | 8.0 |
| ZnO MB | 100.0 |
| | 1,500.0 |

Sample No. 9 (Specific Gravity 1.26)

| Ingredients | Amount (In Grams) |
|---|---|
| CPE SD-566 | 640.0 |
| EVA LD-401 | 409.0 |
| KE Clay | 254.0 |
| TriBase E | 62.6 |
| Antimony Oxide | 29.5 |
| Agerite MA | 3.7 |
| | 1,398.8 |

The base formulation resulting from the mixing operation 9 is then processed in a manner similar to that of the accelerated concentrate in the first embodiment of the invention. Thus, the base formulation may be extruded through a two-roll mill, cooled, diced, dried, and stored as indicated by operations 10, 11, 12 and 13 of the figure.

An important aspect of the present invention is the absence or low levels of liquid plasticizers in the base formulations of the elastomers. Apparently, the resins serve as high temperature primary plasticizers for the elastomers and reduce the "nerve" and increase the shear sensitivity of the mixtures. Further, reduced levels of fillers such as carbon black and clay are required to produce processible mixtures. The particles of the base formulation to be introduced into the extruder in operation 15 of the figure should be discrete and free-flowing.

The base formulation to be introduced into the extruder at operation 15 is mixed before or during this operation with a cross-linking formulation as obtained by operations 1 to 5 of the figure.

Examples of cross-linking formulations which can be used in the second embodiment of the present invention are as follows:

SAMPLE CROSS-LINKING FORMULATIONS

Sample No. 10 (Specific Gravity 1.26)

| Ingredients | Amount (In Grams) |
|---|---|
| Na-22 (an ethylene thiourea cross-linking agent obtained from DuPont) | 350.0 |
| MBTS (a benzothiazyl disulfide obtained from R. T. Vanderbilt) | 210.0 |
| CPE SD-566 | 350.0 |
| DQDA 3737 | 420.0 |
| Red Lead MB | 70.0 |
| | 1,400.0 |

Sample No. 11 (Specific Gravity 1.28)

| Ingredients | Amount (In Grams) |
|---|---|
| NBC (A nichel dimethyl dithiocarbamate cross-linking agent obtained from DuPont) | 266.3 |
| Tetrone A (a cross-linking agent obtained from DuPont) | 400.0 |
| CPE 566 | 333.0 |
| DQDA 3737 | 333.0 |
| Litharge MB (90%) | 66.6 |
| | 1,398.9 |

Sample No. 12 (Specific Gravity 1.28)

| Ingredients | Amount (In Grams) |
|---|---|
| CPE 566 | 350.0 |
| DQDA 3737 | 263.0 |
| Ethyl Cadmate (a cadmium diethyl dithiocarbamate cross-linking agent obtained from R. T. Vanderbilt) | 219.0 |
| ALTAX (a benzothiozyl disulfide cross-linking agent obtained from R. T. Vanderbilt) | 481.0 |
| Sulfur obtained from C. P. Hall | 87.0 |
| | 1,400.0 |

Sample No. 13 (Specific Gravity 1.24)

| Ingredients | Amount (In Grams) |
|---|---|
| Methyl Ethyl Tuads | 340.0 |
| ALTAX | 382.0 |
| Sulfur | 42.5 |

-continued

SAMPLE CROSS-LINKING FORMULATIONS

| | |
|---|---|
| CPE SD-566 | 297.0 |
| DQDA 3737 | 340.0 |
| | 1,401.5 |

Sample No. 14 (Specific Gravity 1.328)

| Ingredients | Amount (In Grams) |
|---|---|
| CPE SD-566 | 438.0 |
| DQDA 3737 | 344.0 |
| Bismate (a bismuth dimethyl dithiocarbamate cross-linking agent obtained from R. T. Vanderbuilt) | 250.0 |
| ALTAX | 187.0 |
| Sulfur | 250.0 |
| Litharge MB (90%) | 31.0 |
| | 1,500.0 |

Sample No. 15 (Specific Gravity 1.60)

| Ingredients | Amount (In Grams) |
|---|---|
| DiCup R | 405.0 |
| KE Clay | 945.0 |
| TriBase E | 45.0 |
| CPE SD-566 | 180.0 |
| EVA LD-401 | 225.0 |
| | 1,800.0 |

The particulate or diced cross-linking formulation resulting from operation 4 as shown in the figure is then mixed with the particulate or diced base formulation obtained as described above and introduced into the extruder operation 15. The two formulations can be properly mixed by simple coarse blending by shaking them together in a bag. Alternatively, metering and blending systems such as a Conair Autocolor can be used for this purpose.

The following examples of the operation of the present invention are given but are not to be construed in any manner as limiting the scope of the invention.

EXAMPLES 1-4

In order to demonstrate the high efficiency of the use of various equipment as well as the wide scope of the present invention, the following four examples are offered. Two of the examples represent the first embodiment of the invention using virgin polymer resins while two represent the second embodiment for formulating a cross-linkable elastomer. The two virgin resin polymer cross-linking concentrate systems have been composed to yield two black, 600 volt rated, cross-linked, insulations: one based on polyethylene homopolymer and the other based on ethylenevinylacetate copolymer. The two polymeric based compositions were designed with two elastomers, neoprene and hypalon. Two cross-linking concentrates were formulated so that each one corresponds to a particular elastomer. It should be noted that the neoprene product is notorious within the industry for being exceptionally scorchy. The neoprene-red lead-Na22 system, while being desirable for its low water absorbing properties, is seldom, if ever, used because of the frequent occurrence of premature cross-linking or scorch. The neoprene and hypalon based products herein described have been constructed to yield a black, heavy duty jacket with low moisture absorbing properties for electrical wire and cable use.

Although these formulations are for utilization in the wire and cable industry, an industry where technical requirements of materials are stringent, they can be altered by one skilled in the art to suit other industrial needs.

The formulations listed below were mixed in a laboratory-scale Banbury mixer, sheeted off a laboratory two-roll mill at 150° to 180° F., air cooled and hand diced. Standard Banbury mixing procedures known in the art can be used to form an intimate blend. The Banbury conditions actually used are listed below. It should be noted that compounds for end-product use were made by coarsely blending and feeding the proper base compound and cross-linking concentrate or resin polymer and concentrate in the proper proportions to an extruder for final intimate mixing. This final mixing was performed in a Brabender laboratory scale extruder.

LABORATORY BANBURY MIXING CONDITIONS AND DATA

| | First Embodiment | Second Embodiment | | | |
|---|---|---|---|---|---|
| | Examples 1 & 2 | Example 3 | | Example 4 | |
| Banbury Condition | DiCup C.* | Neoprene B.** | Na-22 C.* | Hypalon B.** | Tetrone C.* |
| Rotor speed rpm | 80 | 80 | 80 | 80 | 80 |
| Ram pressure psi | 20 | 20 | 20 | 20 | 20 |
| Thermal condition of the Banbury | Neutral*** | Neutral | Neutral | Neutral | Neutral |
| Data Collected: | | | | | |
| Average power hp | 5 | 7 | 5 | 11 | 7 |
| Peak power hp | 12 | 9 | 11 | 14 | 10 |
| Mixing time (minutes) | 3.5 | 2.1 | 3.4 | 1.0 | 2.3 |
| Final mixture temperature ° F. | 230 | 250 | 220 | 230 | 220 |

*C. = Concentrate containing cross-linking agent.
**B. = Base compound without cross-linking agent.
***Neither heating nor cooling used to control temperature.

The following formulations were obtained under the above conditions.

DI CUMYL PEROXIDE (DI CUP) CONCENTRATE FORMULATION
Examples 1 and 2

Specific Gravity 1.10

| Ingredients | Parts/100 Parts Polymer Of Concentrate (By Weight) |
|---|---|
| Chlorinated Polyethylene SD-566 (from Dow Chemical) used as a dispersing aid | 36.0 |
| Ethylene Vinylacetate Copolymer LD-401 (from Exxon) used as a particulating aid | 64.0 |

DI CUMYL PEROXIDE (DI CUP) CONCENTRATE FORMULATION
Examples 1 and 2

Specific Gravity 1.10

| Ingredients | Parts/100 Parts Polymer Of Concentrate (By Weight) |
|---|---|
| Carbon Black N-550 (from Phillips Petroleum) used to protect against light degradtion | 25.0 |
| AgeRite MA (from Vanderbilt Corp.) used as an antioxidant | 1.6 |
| TriBase E (basic lead silicate) from NL Industries) used as a sulfate stabilizer for SD-566 | 1.6 |
| DiCup T (di cumyl peroxide, technical grade) (from Hercules, Inc.) used as a cross-linking agent | 10.3 |
| | 138.5 |

Twenty-three parts by weight of the above concentrate, when mixed with seventy-seven parts by weight of either of the virgin polymers polyethylene homopolymer LD-400 (Example 1) or ethylene vinylacetate copolymer LD-401 (Example 2) (both from Exxon) will result in a composition suitable for use as a black, cross-linked, 600 volt rated insulation. Obviously, blends of these two virgin polymers totalling 77 parts by weight can be extruder accelerated with 23 parts by weight of the DiCup concentrate.

NEOPRENE BASED COMPOSITION
Example 3

Specific Gravity 1.46

| Ingredients | Parts/100 Parts Polymer of Concentrate (By Weight) |
|---|---|
| Neoprene W (from E. I. duPont) | 76.0 |
| Ethylene Vinylacetate DQDA-3737 (from Union Carbide) used as a particulating aid | 24.0 |
| Carbon Black N-550 (from Phillips Petroleum) used as a reinforcing filler | 25.0 |
| Hard Clay (hydrated alumnium silicate (from J. M. Huber) used as a filler | 29.0 |
| AgeRite Stalite S (a mixture of alkylated diphenylamines) (from R. T. Vanderbilt) used as an antioxidant | 1.3 |
| Stearic Acid (from Harwick Chemical) used as an activator and processing aid | 0.9 |
| Zinc Oxide Master Batch (ZnO) (from Wyrough and Loser) used as an activator | 1.8 |
| Red Lead ($Pb_3O_4$) Master Batch KRD-90 (from Wyrough and Loser) used as an activator and moisture inhibitor | 12.7 |
| | 170.7 |

Ninety-seven and one-half parts by weight of the neoprene base composition are to be extruder mixed with two and one-half parts by weight of the Na-22 concentrate to yield a heavy duty neoprene jacket compound.

Na-22 CONCENTRATE FORMULATION
Example 3

Specific Gravity 1.26

| Ingredients | Parts/100 Parts Polymer of Concentrate (By Weight) |
|---|---|
| Chlorinated Polyethylene SD-566 (from Dow Chemical) used as a dispersing aid | 45.0 |
| Ethylene Vinylacetate Copolymer DQDA-3737 (from Union Carbide) used as a particulating aid | 55.0 |
| Red Lead ($Pb_3O_4$) Master Batch KRD-90 (from Wyrough and Loser) used as a stabilizer for SD-566 | 9.1 |
| MBTS (benzothiaryldisulfide) (from United States Rubber) used as a retarder for Neoprene | 27.3 |
| Na-22 (ethylenethiourea) (from E. I. duPont) used as a cross-linking agent | 45.0 |
| | 181.4 |

HYPALON BASED COMPOSITION
Example 4

Specific Gravity 1.44

| Ingredients | Parts/100 Parts Polymer of Concentrate (By Weight) |
|---|---|
| Hypalon 40-E chlorosulfonated polyethylene (from E. I. duPont) | 75.0 |
| Ethylene Vinylacetate Copolymer DQDA 3737 (from Union Carbide) used as a particulating aid | 25.0 |
| Carbon Black N-550 (from Phillips Petroleum) used as a reinforcing filler | 17.0 |
| Hard Clay - hydrated aluminum silicate (from J. M. Huber) used as a filler | 47.0 |
| Stearic Acid (from Harwick Chemical) used as an activator and processing aid | 0.9 |
| Litharge (PbO) Master Batch KLD-90 (from Wyrough and Loser) an activator an moisture inhibitor | 17.5 |
| | 182.4 |

Ninety-seven and three-eights parts of weight of hypalon base are designed to be extruder mixed with two and five-eighths parts by weight of the Tetrone A concentrate resulting in a composition to be used as a heavy duty cable jacket.

TETRONE-A CONCENTRATE FORMULATION
Example 4

Specific gravity 1.28

| Ingredients | Parts/100 Parts Polymer of Concentrate (By Weight) |
|---|---|
| Chlorinated Polyethylene SD-566 (from Dow Chemical) used as a dispersing aid | 50.0 |
| Ethylene Vinylacetate Copolymer DQDA 3737 (from Union Carbide) used as a particulating aid | 50.0 |
| Litharge (PbO) Master Batch KLD-90 (from Wyrough and Loser) used as a stabilizer from SD-566 | 10.0 |
| NBC (Nickel dibutyldithiocarbamate) 11 (from E. I. duPont) used as a protective agent as defined by duPont | 40.0 |
| Tetrone A (dipenta methylene thiuram hexasulfine) (from E. I. duPont) used as a cross-linking agent | 60.0 |

-continued

TETRONE-A CONCENTRATE FORMULATION
Example 4
Specific gravity 1.28

| Ingredients | Parts/100 Parts Polymer of Concentrate (By Weight) |
|---|---|
| | 210.0 |

The particular amounts of additives other than the polymers can be varied substantially in the above five formulations, as known in the art. Thus, the following sample ranges are given for these specific additives in the above formulations.

INGREDIENT RANGES
Expressed In Parts By Weight/100 Parts Of Polymer

| Ingredient | Suitable Range | Preferred Range |
|---|---|---|
| DL CUP CONCENTRATE (EXAMPLES 1 & 2) | | |
| Carbon Black N-550 | 10-50 | 15-30 |
| AgeRite MA | 1-4 | 1-3 |
| TriBase E | 0-4 | 1-3 |
| DiCup T | 5-17 | 7-15 |
| NEOPRENE BASE COMPOSITION (EXAMPLE 3) | | |
| Carbon Black N-550 | 5-40 | 15-30 |
| Hard Clay filler | 0-40 | 15-30 |
| AgeRite Stalite S | 0.4-4 | 0.75-2 |
| Stearic Acid | 0-2 | 0.50-1.25 |
| Zinc Oxide MB | 0-10 | 1.25-4 |
| Red Lead MB | 0-25 | 7.50-20 |
| Na-22 CONCENTRATE (EXAMPLE 3) | | |
| Red Lead MB | 1.5-20 | 5-10 |
| MBTS | 0-50 | 9-40 |
| Na-22 | 20-70 | 30-60 |
| HYPALON BASE COMPOSITION (EXAMPLE 4) | | |
| Carbon Black N-550 | 3-40 | 9-20 |
| Hard Clay | 9-60 | 15-40 |
| Stearic Acid | 0-4 | 0.7-2 |
| Litharge MB | 5-30 | 9-25 |
| TETRONE A CONCENTRATE (EXAMPLE 4) | | |
| Litharge MB | 2-25 | 6-15 |
| NBC | 0-90 | 20-65 |
| Tetrone A | 30-90 | 40-65 |

In order to demonstrate the utility of both embodiments of the present invention whereby formulations may be stored for extended periods, the viscosities of the above formulations were measured just after production and then again after 12 weeks as indicated below.

CONCENTRATE AND BASE COMPOSITION RHEOLOGICAL DATA

| | Mooney Viscosity (ML 1 + 3 at at 121° C.) | |
|---|---|---|
| Composition | Initial Value | Value After 12 Weeks |
| DiCumyl Peroxide Concentration | 10 | 9 |
| Neoprene Base | 34 | 36 |
| Na-22 Concentrate | 13 | 12 |
| Hypalon Base | 51 | 55 |
| Tetrone A Concentrate | 15 | 14 |

The adequacy of each polymeric base composition (for neoprene and hypalon) and each of the cross-linking concentrates was checked by measuring the Mooney viscosity value at 121° C. (ML 1 plus 3) minutes. This test was performed twice, initially when each composition was compounded and then again 12 weeks later. Mooney viscosities of 5 to 75, preferably of 10 to 50, at (ML 1 plus 3) at 120° C. are suitable for processing.

Also measured was the curing characteristics at 200° C. with the Monsanto Rheometer with a 3 degree arc, and the physical, aging, and electrical properties of molded slabs cured at 160° C. and 250 to 300 psi for 10 to 15 minutes.

The free-flowing character of the particles of each base composition and each concentrate was checked periodically over a 12-week period. They all were found to be free-flowing with no sign of inter-particle adhesion or coalescing.

Four complete compositions were prepared from the formulations given. A coarse blend of the ingredient composites that had been diced by hand was made by shaking the proper weight of composites as shown in the table below, in a paper bag and feeding it to a laboratory-scale Brabender extruder equipped with a metering screw, and a rod-forming die, ⅛ inch in diameter.

| Example | Cross-Linking Concentrate | Base |
|---|---|---|
| 1 - Cross-linkable black PE insulation | 69 g. DiCup concentrate | 231 g. PE LD-400 |
| 2 - Cross-linkable black EVA insulation | 69 g. DiCup concentrate | 231 g. EVA LD-401 |
| 3 - Black neoprene jacket compound | 7.5 g. Na-22 concentrate | 292.5 g. Neoprene base compound |
| 4 - Black hypalon jacket compound | 7.9 g. Tetrone A concentrate | 292.1 g. Hypalon base compound |

The extruder conditions for simultaneously mixing and extruding to form insulation compounds in Examples 1 and 2 were as follows:

| Zone #1 | 235° F. |
|---|---|
| Zone #2 | 235° F. |
| Head | 235° F. |
| Screw speed | 40 rpm. |

The extruder conditions for simulatneously mixing and extruding to form jacket compounds in Examples 3 and 4 were as follows:

| Zone #1 | 180° F. |
|---|---|
| Zone #2 | 180° F. |
| Head | 180° F. |
| Screw speed | 40 rpm. |

The following properties of the extruded mixtures were observed:

| | Example | | | |
|---|---|---|---|---|
| Tests | 1 | 2 | 3 | 4 |
| Mooney Viscosity ML 1 + 3 at 121° C. | 7.5 | 7.5 | 32 | 50 |
| Monsanto Rheometer Cure Curve at 200° C. and ± 3 degree arc | | | | |
| minimum torque lb-in | 1.0 | 3.5 | 11.0 | 18.0 |
| time to cure* initiation in min. | 1.0 | 1.0 | 0.5 | 0.7 |
| maximum torque lb-in | 22.0 | 27.5 | 40.5 | 50.0 |
| time to 50% cure in min. | 1.6 | 1.8 | 1.0 | 1.1 |
| time to 90% cure | | | | |

-continued

| Tests | Example | | | |
|---|---|---|---|---|
| | 1 | 2 | 3 | 4 |
| in min. | 2.4 | 2.8 | 1.7 | 1.7 |

*Time when torque is two lb-in above minimum torque value.

The extrudates in rod form were allowed to cool in the air. Pieces of rods were placed in a mold measuring 8×8×0.075 inches so as to slightly overfill it. The insulations were cured at 320° F. and 250 to 300 psi pressure for fifteen minutes. The jackets were cured at 320° F. and 250 to 300 psi pressure for ten minutes. When curing cycles were completed, the molds were cooled under pressure to a mold temperature of approximately 120° F. and the cross-linked slabs were removed.

The cured samples showed the following characteristics:

PHYSICAL, AGING, AND ELECTRICAL PROPERTIES OF CURED COMPOSITIONS

| Tests | Examples* | | | |
|---|---|---|---|---|
| | 1 | 2 | 3 | 4 |
| Initial Physicals | | | | |
| Tensile strenth psi | 2447 | 2492 | 2415 | 2345 |
| Modulus at 200% elong. psi | 1412 | 1230 | 1282 | 2147 |
| % Elongation at break | 474 | 452 | 380 | 252 |
| Physicals After Aging 7 Days In 121° C. Air Circulating Oven | | | | |
| % Retention of tensile strength | 107 | 115 | 66 | 95 |
| % Retention of Elongation at break | 113 | 89 | 44 | 44 |
| Low Temperature Properties | | | | |
| Clash-Berg temperature when modulus of rigidity is 45,000 psi | −32° C. | −38° C. | −39° C. | −22° C. |
| Flamability | | | | |
| Oxygen Index | 19.09 | 19.63 | >40.26 | >40.26 |
| Electrical Properties | | | | |
| Dielectric constant | 2.5 | 2.8 | 9.4 | 8.1 |
| % Power factor | 0.13 | 0.3 | 30.4 | 17.0 |
| Volume resistivity in ohm-cm. | $2.5 \times 10^{16}$ | $1.1 \times 10^{16}$ | $6.5 \times 10^{13}$ | $4.4 \times 10^{14}$ |

*Example 1 - Polyethylene homopolymer based composition for use in a black 600 volt rated insulation.
Example 2 - Ethylene vinylacetate copolymer based compositon for use in a black, 600 volt ratedinsulation.
Example 3 - Neoprene based composition for use as a blackjacket compound.
Example 4 - Hypalon based composition for use as a blackjacket compound.

The data for the black cross-lined insulations, both PE and EVA, shown in the above table are in general compliance with wire and cable industry specifications. The properties of hypalon jacket compound are also within the general wire and cable industry specifications and indeed are in agreement with published results.

An added advantage of the extruder acceleration process is that it reduces the scorchiness of cross-linkable polymeric compounds without altering the chemistry of the established curing systems. Therefore, established curing systems and manufacturing procedures remain applicable and endproduct performance is not affected. Extruder acceleration combines the active ingredients at the last possible moment before curing.

The data accumulated on the neoprene jacket compound in Example 3 are surprising in that the aging character of this compound is greatly superior to that commonly obtained for neoprene compositions. This result may well be an indication of the effects of eliminating oils and the reduction of filler loading. The result may have been effected by the Na-22-red lead (cross-linking and activator) combination. As stated above, this system is seldom if ever used in neoprene because of the scorchiness of the resultant mixture. The aging character of the neoprene composition at elevated temperatures as shown by the circulating hot air oven test is remarkable, considering that the test is so severe that it is not an industrial requirement. Also, properties such as the low temperature properties of the neoprene product and compression set properties should also improve.

EXAMPLE 5

A cross-linked chlorinated polyethylene material was prepared according to the second embodiment of the present invention.

The base formulation was prepared by mixing the following materials in the same Banbury mixer at the same conditions as set forth in Example 4 with the exception that a 250° F. temperature was maintained.

| CPE SD-566 | 640.0 grams |
|---|---|
| EVA LD-401 | 409.0 grams |
| KE Clay | 254.0 grams |
| TriBase E | 62.6 grams |
| Antimony Oxide | 29.5 grams |
| AgeRite MA | 3.7 grams |

The discharged chlorinated polyethylene base formulation was sheeted out on a laboratory two-roll mill maintained between 220° and 240° F. and was cooled and diced as in Example 4.

The cross-linking formulation was prepared by introducing a first charge of the following ingredients to the same Banbury mixer maintained at 230° F.

| CPE SD-566 | 234.0 grams |
|---|---|
| EVA LD-401 | 261.0 grams |
| KE Clay | 730.0 grams |
| TriBase E | 41.0 grams |
| DiCup R | 332.0 grams |

After mixing a second charge of 100 grams of DiCup R was introduced and mixed to obtain a homogeneous mixture at 220° F. Finally, a third charge of 100 grams of DiCup R was introduced into the cross-linking formulation and mixed at 220° F.

The discharged cross-linking formulation was cooled, sheeted and diced in a manner similar to the same operation in Example 4 above.

The two formulations were coarsely blended by shaking 22.0 grams of cross-linking formulation and 378.0 grams of base formulation together in a paper bag. The blend was then fed into a Brabury laboratory extruder equipped with a metering screw and a ⅛ inch diameter die with the extruder zones set at 235° F. and a screw speed of 40 rpm.

The air-cooled extrudate was molded and cross-linked in a manner similar to Example 1 above to obtain a cross-linked chlorinated polyethylene material according to the second embodiment of the present invention.

While in the foregoing specification, embodiments of the invention have been described in detail, it will be appreciated that numerous changes may be made in those details by those skilled in the art without departing from the spirit and principles of the invention.

What is claimed is:

1. A process for the production of a vulcanizable mixture of a crystalline polymer and a cross-linking agent comprising
    (a) feeding
        (i) a first composition consisting essentially of a crystalline polymer; and
        (ii) a second composition comprising an admixture of an amorphous elastomeric polymer and a cross-linking agent, said compositions being mutually miscible, into a pumping screw extruder, said first composition (i) and second composition (ii) both comprising free-flowing particles of less than 1 inch in size and of Mooney viscosities at 121° C. in the range of 3 to 75 Mooney points after 4 minutes; and
    (b) extruding said first and second compositions in admixture in said pumping screw extruder, such that when the admixture is tested in a Brabender mixing bowl apparatus conditioned to 100° C. and operated with the mixing blades rotating at 40 rpm, the recorded energy required to perform the mixing is in the range of 700 to 3500 meter-grams.

2. The process of claim 1 including subsequently
    (c) shaping the extrudate from the extruder.

3. The process of claim 2, including subsequently (d) energizing said shaped extrudate to effect vulcanization.

4. The process of claim 1, wherein said crystalline polymer is selected from the group consisting of polyethylene, ethylene-vinylacetate copolymer, ethylene-propylene copolymer containing 50% by weight or more ethylene and ethylene-propylene-diene terpolymer having 50% by weight or more ethylene.

5. The process of claim 1, wherein said first composition (i) and said second composition (ii) particles are about 1/16 to ⅜ of an inch in size.

6. The process of claim 1, wherein said second composition (ii) further includes one or more materials selected from the group consisting of antioxidants, processing aids, fillers, plasticizers, and stabilizers.

7. The process of claim 1, wherein said crystalline polymer is selected from the group consisting of polyethylene, ethyene-vinylacetate copolyer, ethylene-propylene copolymer having 50 weight % or above ethylene, and ethylene-propylene-diene terpolymer having more than 50 weight % ethylene and said amorphous elastomeric is selected from the group consisting of chlorinated polyethylene, ethylene-propylene-diene terpolymer having less than 50 weight % ethylene and ethylene-propylene copolymer having about 30 weight % or less ethylene.

8. The process of claim 1, wherein said extruding step (b) is conducted at a temperature of about 80° to 140° C.

9. The process of claim 8, wherein said temperature is from about 82° to 112° C.

10. A process for the production of a crystalline vulcanizable mixture of a polymer and a cross-linking agent comprising
    (a) feeding
        (i) a first composition consisting essentially of a crystalline polymer selected from the group consisting of polyethylene, ethylene-vinylacetate copolymer, ethylene-propylene copolymer containing 50% by weight or more ethylene and ethylene-propylene-diene terpolymer having 50% by weight or more ethylene; and
        (ii) a second composition comprising an admixture of a crystalline polymer, an amorphous elastomeric polymer and a cross-linking agent, wherein the crystalline polymer of said second composition is selected from the group consisting of polyethylene, ethylene-vinylacetate copolymer, ethylene-propylene copolymer having 50 weight % or above ethylene and ethylene-propylene-diene terpolymer having 50 weight percent or above ethylene and said amorphous elastomeric polymer is selected from the group consisting of chlorinated polyethylene, ethylene-propylene-diene terpolymer having less than 50 weight % ethylene and ethylene-propylene copolymer having about 30 weight % or less ethylene, said compositions being mutually miscible, into a pumping screw extruder, said first composition (i) and second composition (ii) both comprising free-flowing particles of less than 1 inch in size and of Mooney viscosities at 121° C. in the range of 3 to 75 Mooney points after 4 minutes; and
    (b) extruding said first and second compositions in admixture in said pumping screw extruder, such that when the admixture is tested in a Brabender mixing bowl apparatus conditioned to 100° C. and operated with the mixing blades rotating at 40 rpm, the recorded energy required to perform the mixing is in the range of 700 to 3500 meter-grams.

11. The process of claim 10, including subsequently
    (c) shaping the extrudate from the extruder.

12. A process for the product of a vulcanizable mixture of a polymer and a cross-linking agent comprising
    (a) feeding
        (i) a first composition comprising an amorphous elastomeric polymer and a crystalline polymer in admixture; and
        (ii) a second composition comprising a crystalline polymer and a cross-linking agent in admixture, said compositions being mutually miscible, into a pumping screw extruder, said first composition (i) and second composition (ii) both comprising free-flowing particles of less than 1 inch in size and of Mooney viscosities at 121° C. in the range of 3 to 75 Mooney points after 4 minutes; and
    (b) extruding said first and second compositions in admixture in said pumping screw extruder, such that when the admixture is tested in a Brabender mixing bowl apparatus conditioned to 100° C. and operated with the mixing blades rotating at 40 rpm, the recorded energy required to perform the mixing is in the range of 700 to 3500 meter-grams.

13. The process of claim 12, wherein said amorphous elastomeric polymer in said first composition (i) is an amorphous elastomeric polymer selected from the group consisting of polychloroprene, chlorosulfonated polyethylene, acrylonitrile-butadiene copolymer, acrylonitrile-butadiene copolymer and polyvinyl chloride blend, styrene-butadiene copolymer, chlorinated polyethylene, ethylene-propylene-diene terpolymer having less than 50 weight % ethylene, and ethylene-propylene copolymer having about 30 weight % or less ethylene.

14. The process of claim 12 including subsequently
    (c) shaping the extrudate from the extruder.

15. The process of claim 14, including subsequently (d) energizing said shaped extrudate to effect vulcanization.

16. The process of claim 12, wherein said first composition (i) further includes one or more materials selected from the group consisting of antioxidants, processing aids, fillers, plasticizers, and stabilizers.

17. The process of claim 12, wherein said first composition (i) and said second composition (ii) particles are about 1/16 to ⅜ of an inch in size.

18. The process of claim 12, wherein said extruding step (b) is conducted at a temperature of about 80° to 140° C.

19. The process of claim 18, wherein said temperature is from about 82° to 112° C.

20. The process of claim 12, wherein second composition (ii) further comprises an amorphous elastomeric polymer selected from the group consisting of ethylene-propylene copolymer having about 30 weight % or less ethylene, chlorinated polyethylene and ethylene-propylene-diene terpolymer having less than 50 weight % ethylene.

21. A process for the production of a vulcanizable mixture of a polymer and a cross-linking agent comprising
(a) feeding
(i) a first composition comprising an amorphous elastomeric polymer and a crystalline polymer in admixture, said amorphous elastomeric polymer being selected from the group consisting of polychloroprene, chlorosulfonated polyethylene, acrylonitrile-butadiene copolymer, acrylonitrilebutadiene copolymer and polyvinyl chloride blend, styrene-butadiene copolymer, chlorinated polyethylene, ethylene-propylene-diene terpolymer having less than 50 weight % ethylene and ethylene-propylene copolymer having about 30 weight % or less ethylene and said crystalline polymer being selected from the group consisting of polyethylene, ethylene-vinylacetate copolymer, ethylene-propylene copolymer containing 50% by weight or more ethylene and ethylene-propylene-diene terpolymer having 50% by weight or more ethylene; and
(ii) a second composition comprising a crystalline polymer and a cross-linking agent in admixture, said crystalline polymer being selected from the group consisting of polyethylene, ethylene-vinylacetate copolymer, ethylene-propylene copolymer containing 50% by weight or more ethylene, and ethylene-propylene-diene terpolymer having 50% by weight or more ethylene, said compositions being mutually miscible, into a pumping screw extruder, said first composition (i) and second composition (ii) both comprising free-flowing particles of less than 1 inch in size and of Mooney viscosities at 121 degrees C. in the range of 3 to 75 Mooney points after 4 minutes; and
(b) extruding said first and second compositions in admixture in said pumping screw extruder, such that when the admixture is tested in a Brabender mixing bowl apparatus conditioned to 100 degrees C. and operated with the mixing blades rotating at 40 rpm, the recorded energy required to perform the mixing is in the range of 700 to 3500 meter-grams.

22. The process of claim 21, including subsequently
(c) shaping the extrudate from the extruder.

23. The process of claim 21, wherein said second composition (ii) further comprises an amorphous elastomeric polymer selected from the group consisting of a ethylene-propylene copolymer having about 30 weight % or less ethylene, chlorinated polyethylene and a ethylene-propylene-diene terpolymer having less than 50 weight % ethylene.

24. The process of claim 23, wherein said amorphous elastomeric polymer is chlorinated polyethylene.

25. The process of claim 11 including subsequently (d) energizing said shaped extrudate to effect vulcanization.

26. The process of claim 10, wherein said first composition (i) and said second composition (ii) particles are 1/16 to ⅜ of an inch in size.

27. The process of claim 10, wherein said second composition (ii) further includes one or more materials selected from the group consisting of antioxidants, processing aids, fillers, plasticizers and stabilizers.

28. The process of claim 10, wherein said extruding step (b) is conducted at a temperature of about 80 to 140 degrees C.

29. The process of claim 28, wherein said temperature is from about 82 to 112 degrees C.

30. The process of claim 22 including subsequently (d) energizing said shaped extrudate to effect vulcanization.

31. The process of claim 21, wherein said first composition (i) and said second composition (ii) particles are about 1/16 to ⅜ of an inch in size.

32. The process of claim 21, wherein said first composition (i) further includes one or more materials selected from the group consisting of antioxidants, processing aids, fillers, plasticizers, and stabilizers.

33. The process of claim 21, wherein said extruding step (b) is conducted at a temperature of about 80 to 140 degrees C.

34. The process of claim 33, wherein said temperature is from about 82 to 112 degrees C.

* * * * *